3,308,140
CHAIN SUBSTITUTED HIGHER FATTY ACIDS
Edward T. Roe, Flourtown, and Dolores A. Konen and Daniel Swern, Philadelphia, Pa., assignors to the United States of America as represented by the Secretary of the Agriculture
No Drawing. Filed June 24, 1963, Ser. No. 290,261
9 Claims. (Cl. 260—404)

A non-exclusive, irrevocable, royalty-free license in the invention herein described, throughout the world for all purposes of the United States Government, with the power to grant sublicenses for such purposes, is hereby granted to the Government of the United States of America.

This invention relates to a new method for the preparation of dicarboxylic acids and other chain substituted fatty acids, and particularly relates to the preparation of derivatives from unsaturated fatty acids.

Dicarboxylic acids are very important materials for use by the chemical industry. There is an increasing interest in the preparation of dicarboxylic acids from unsaturated fatty acids, and biochemical as well as chemical procedures have been disclosed. Most of these procedures have, however, characteristics which seriously limit their application, and other methods of preparation are desired.

An object of the present invention is to provide a novel process for the preparation of dicarboxylic acids. Another object is to prepare novel chain-substituted fatty acids. Other objects and a fuller understanding of the invention may be had by referring to the following description and claims.

According to the invention an alkyl ester of an unsaturated fatty acid, a large molar excess of an addendum such as acetic anyhdride, ethyl cyanoacetate, diethyl malonate, benzaldehyde, valeraldehyde, or methyl ethyl ketone, and a free radical initiator are combined and heated under an inert atmosphere, such as nitrogen, to give a chain-substituted fatty acid.

We have discovered that acetic anhydride, ethyl cyanoacetate, and diethyl malonate can be added with free-radical initiation to the double bond of a terminally or non-terminally unsaturated fatty acid ester to provide, after hydrolysis, a dicarboxylic acid having two more carbon atoms than the parent fatty acid. The dicarboxylic acids obtained are selected from those having the following general formuas:

$$R-CH_2-CH-(CH_2)_n-COOH$$
$$\quad\quad\quad\quad | $$
$$\quad\quad\quad\quad CH_2COOH$$

and $$R-CH-CH_2-(CH_2)_n-COOH$$
$$| $$
$$CH_2COOH$$

wherein R is selected from the group consisting of hydrogen and an alkyl radical, and $n$ is an integer from 7 to 12. The reaction with acetic anhydride is described in detail and is considered to proceed under free radical conditions according to the following type equations:

(1) $\quad RO-OR \xrightarrow{HEAT} 2RO\cdot$
(Initiator)

(2)
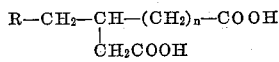

(3)
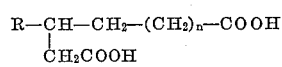

(4)
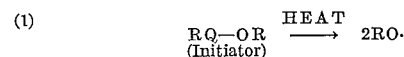
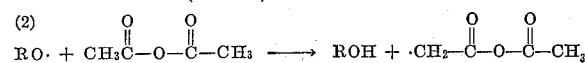

The anhydride moiety of the addition product is then hydrolyzed to produce an acid:

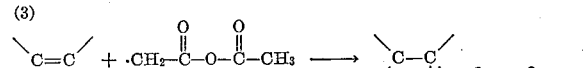

Ethyl cyanoacetate and diethyl malonate also added to the double bond in similar fashion yielding ester-adducts which are hydrolyzed to the same dicarboxylic acid.

As illustrated in the examples, dicarboxylic acids can be prepared from esters of unsaturated fatty acids in which the double bond is located terminally or non-terminally in the carbon chain. With undecylenates, the addition is essentially quantative. With esters of long carbon chain fatty acids, such as methyl oleate, the internal double bond is less reactive and yields may be lower. The unsaturated starting material is readily recovered, however, by converting the hydrolyzed reaction products to methyl esters and separating the mono- and dicarboxylic acid derivatives.

We have also discovered that other active-hydrogen compounds such as benzaldehyde, valeraldehyde and methyl ethyl ketone can be added to esters of unsaturated fatty acids to provide novel chain-substituted ketonic fatty acid esters. The reactions are illustrated as follows, showing only the double bond portion of the unsaturated fatty acid ester:

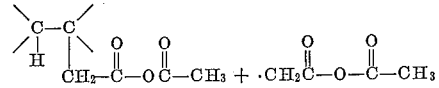

wherein R is aryl or alkyl, and

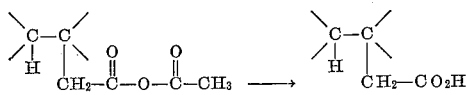

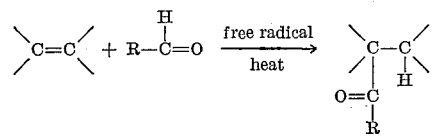

In a typical reaction for preparation of dicarboxylic acids the unsaturated ester, a large excess of acetic anhydride, ethyl cyanoacetate or diethyl malonate, and the free radical initiator are combined and heated under an inert atmosphere, such as nitrogen, until the reaction is substantially complete. Excess addendum is removed by distillation. The concentrated residual reaction product is hydrolyzed either by saponifying with aqueous alkali and then acidifying, or by boiling with aqueous acids, to give the free acid. The dicarboxylic acids are separated and purified by conventional procedures.

Yield of product is improved by employing a high molar ratio of addendum to unsaturated compound. Ratios of 50 to 1, or even higher ratios, are preferred, and in the reaction mixture the addendum thus conveniently serves as both reactant and solvent for the unsaturated ester.

Preferred unsaturated esters are the short carbon chain alkyl esters, as prepared by reacting the acid with alcohols such as methanol, ethanol, n-butanol, or 2-ethylhexanol. These esters are readily soluble in the addenda and may be obtained in substantially pure form by fractional distillation. Since the free acid function is considered a deterrent to effectiveness of the free radical initiator it is important that the unsaturated compound be present as the ester and not as the free acid.

The acid may be any monoethenoid fatty acid. Particularly important are the readily available long chain unsaturated fatty acids such as undecylenic, oleic, and erucic. Among the other fatty acids which may be used are caproleic, lauroleic, palmitoleic, petroselinic, petroselaidic, elaidic, vaccenic, cetoleic, brassidic and myristoleic.

A suitable free radical initiator is a decomposing peroxide, such as di-tertiary butyl peroxide, tertiary butyl perbenzoate or benzoyl peroxide. Although typically all of the reactants are combined at one time, frequently it is advantageous to add the mixture consisting of part of the addendum, the unsaturated ester, and the peroxide to the remainder of the addendum incrementally over a period of time. By this method there is a greater assurance of the reaction proceeding as intended, because any inhibitor accidentally present in the initial combination in the reaction vessel would tend to be eliminated before all of the initiator was added.

A convenient operating temperature with acetic anhydride as addendum is the reflux temperature of the reaction mixture, namely about 135–140° C. With other addenda the reaction temperature is controlled by external means. The reaction proceeds at temperatures in the range of 100–110° C., using tertiary butyl perbenzoate and benzoyl peroxide initiation, but at temperatures much below 100° C. the addition is impractically slow.

The following examples are presented in illustration of the invention, but are not intended to be in limitation thereof.

Although Examples 1 to 3, 5 and 6 include hydrolysis of the adduct to provide a dicarboxylic acid, the hydrolysis step may be omitted and the novel, hitherto undisclosed intermediates themselves separated from the reaction mixture.

*Example 1.—Addition of acetic anhydride to methyl undecylenate*

A mixture of 1.98 g. (0.01 mole) of methyl undecylenate (99+%), 408 g. (4.00 mole) of acetic anhydride and 0.206 g. (0.0015 mole) of di-t-butyl peroxide were refluxed under a nitrogen atmosphere for 48 hours in glass apparatus which has been thoroughly dried before use. After recovery of excess acetic anhydride by distillation, the residue was saponified and acidified, yielding 2.3 g. of light yellow solid, M.P. 103–105°, iodine number 3.0, acid number 457 (calculated for brassylic acid 460). The brassylic acid was converted to its dimethyl ester and crystallized from methanol (5 ml./gm.) at −26° C., yielding pearly white scale-like crystals, M.P. 32.0–32.5° C. Recrystallization yielded a product, M.P. 33.0–33.2° C., whose X-ray diffraction pattern agreed with that of an authentic sample.

*Example 2.—Addition of acetic anhydride to methyl oleate*

A mixture of 2.97 g. (0.01 mole) of methyl oleate (94.5%, 4.7% saturates, I. No. 82.7), 102.1 g. (1 mole) of acetic anhydride and 0.206 g. (0.0015 mole) of di-t-butyl peroxide was refluxed under a nitrogen atmosphere for 48 hours in glass apparatus which had been thoroughly dried before use. After removal of the acetic anhydride by distillation, the residue product was saponified and acidified. This material had an iodine number of 68.5 and an acid number of 238, indicating a conversion of methyl oleate to the $C_{20}$ dicarboxylic acid of about 21% (24 hours of reflux yielded a product which was about 18% converted to the $C_{20}$ dicarboxylic acid).

*Example 3.—Addition of acetic anhydride to methyl oleate*

A mixture of 2.97 g. (0.01 mole) of methyl oleate, 4.1 g. (0.04 mole) of acetic anhydride and 0.412 g. (0.003 mole) di-t-butyl peroxide was added at two hour intervals in nine equal increments to 98 g. (0.96 mole) of refluxing acetic anhydride in a nitrogen atmosphere. After the fourth incremental addition, the mixture was allowed to reflux overnight without further addition of peroxide. After 23 hours, incremental addition at two hour intervals was resumed. Total reaction time was 33 hours. Recovery of acetic anhydride followed by saponification and acidification of the reaction product yielded 2.5 g. of a pale yellow viscous liquid having an iodine number of 59.5 and an acid number of 260, indicating a conversion of methyl oleate to the $C_{20}$ dicarboxylic acid of about 30% based on reduction in unsaturation.

In dicarboxylic acids such as those of Examples 2 and 3, the original terminal carboxyl group is readily esterified, but the introduced carboxyl group is so sterically hindered that it is very difficult to esterify. This makes it possible to selectively prepare the mono-ester and then employ the free carboxyl group in reactions to make new derivatives.

As illustrated in Example 4, both carboxyl groups can be esterified by employing rigorous reaction conditions.

*Example 4*

Combined $C_{20}$ crude dibasic acid reaction products (28 g.) obtained from several experiments similar to Examples 2 and 3, 104 g. of methanol and 20.5 g. of dimethyl sulfate were refluxed for 48 hours. The mixture was neutralized with sodium carbonate with cooling. From this, 27 g. of a mixture of methyl oleate and the dimethyl ester of the $C_{20}$ dibasic acid was recovered by conventional means.

Distillation of 25.5 g. of the above mixture yielded fractions boiling at 170–173° at 0.2 mm. consisting predominantly of the dimethyl esters of the $C_{20}$ dibasic acids, as shown by gas-liquid chromatography, and confirmed by nuclear magnetic resonance examination.

*Example 5.—Addition of ethyl cyanoacetate to methyl undecylenate*

A mixture of 1.98 g. (0.01 mole) of methyl undecylenate, 452.5 g. (4.0 mole) of ethyl cyanoacetate and 0.206 g. (0.0015 mole) of di-t-butyl peroxide were heated for 24 hours a 130–135° C. under a nitrogen atmosphere in glass apparatus that had been dried before use. After recovery of excess ethyl cyanoacetate by vacuum distillation, analysis of the residue by gas-liquid chromatography showed an 82% conversion of methyl undecylenate. Acid hydrolysis gave an 80% yield of brassylic acid.

*Example 6*

In a manner similar to that of Example 5, ethyl cyanoacetate was added to methyl oleate. Gas liquid chromatography indicated at 65% yield of addition product in 48 hours. Acid hydrolysis was incomplete, so alkaline hydrolysis and acidification were employed to obtain the dicarboxylic acid product.

*Example 7.—Addition of diethyl malonate to methyl oleate*

A mixture of 2.97 g. (0.01 mole) of methyl oleate, 3.2 g. (0.02 mole) of diethyl malonate and 0.206 g. (0.0015 mole) di-t-butyl peroxide was added at two hour intervals in ten equal increments to 76.8 g. (0.48 mole) of diethyl malonate. The temperature of the reaction mixture was maintained at 135°±5°. After 20 hours the excess diethyl malonate was distilled off under vacuum. Gas-liquid chromatography showed an 86% conversion to addition product.

*Example 8.—Addition of diethyl malonate to methyl undecylenate*

In a manner similar to that of Example 7, diethyl malonate was added to methyl undecylenate. Gas-liquid chromatography indicated a yield of over 97% of addition product of which 60% was made up of one component.

The use of benzaldehyde, valeraldehyde and methyl ethyl ketone as addenda are illustrated in Examples 9, 10 and 11.

*Example 9.—Addition of benzaldehyde to methyl oleate*

A mixture of 2.97 g. (0.01 mole) of methyl oleate (94.5%), 4.25 g. (0.04 mole) benzaldehyde and 0.1942 g. (0.001 mole) tert.-butyl perbenzoate were added dropwise in six minutes to 16.98 g. (0.16 mole) of benzaldehyde at 106° C. The mixture was heated for 24 hours at 91–106° C. under a nitrogen atmosphere in glass apparatus which had been thoroughly dried before use. After removal of most of the excess benzaldehyde by distillation the remaining product was washed with 5% sodium hydroxide solution and then with water using benzene to aid in separation. Upon removal of the benzene under vacuum a yield of 3.3 g. of yellow liquid containing a small amount of white precipitate was obtained. The white precipitate was removed by filtration and identified as a polymer of benzaldehyde. The iodine number of the remaining product was 15.4, indiciating a conversion of methyl oleate of about 81% to a product containing a benzoyl group. This was confirmed by infra red spectra.

*Example 10.—Addition of valeraldehyde to methyl oleate*

In an experiment similar to Example 7, but using valeraldehyde, a product having an iodine number of 49.4 was obtained, indicating a conversion of methyl oleate of about 40% to a product containing a valeryl group and confirmed by infra red spectra.

*Example 11.—Addition of methyl ethyl ketone to methyl oleate*

In an experiment similar to Example 7, but using methyl ethyle ketone as addendum and benzoyl peroxide as catalyst (temperature maintained between 78–85° C. for 24 hours) a product was obtained containing over 5% of an addition product.

We claim:

1. A compound of the formula A—CH$_2$—(CH$_2$)$_9$—COOR' wherein R' is a short carbon chain alkyl group and A is selected from the group consisting of

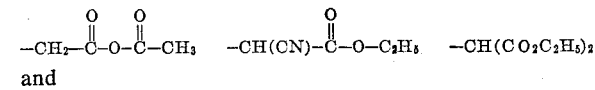

and

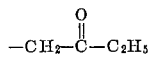

2. The compound of claim 1 in which A is

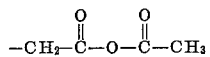

3. The compound of claim 1 in which A is

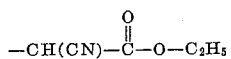

4. The compound of claim 1 in which A is

—CH(CO$_2$C$_2$H$_5$)$_2$

5. A compound of the formula

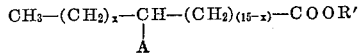

where R' is a short carbon chain alkyl group, x is a number selected from the group consisting of 7 and 8, and A is selected from the group consisting of

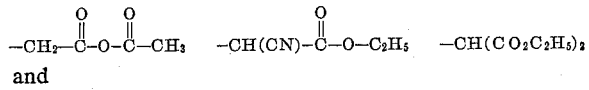

and

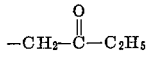

6. The compound of claim 5 in which A is

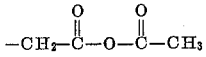

7. The compound of claim 5 in which A is

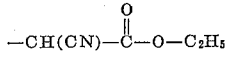

8. The compound of claim 5 in which A is

—CH(CO$_2$C$_2$H$_5$)$_2$

9. The compound of claim 5 in which A is

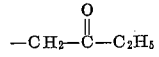

References Cited by the Examiner

UNITED STATES PATENTS

| | | | |
|---|---|---|---|
| 2,577,133 | 12/1951 | Ladd | 260—405 X |
| 2,806,048 | 9/1957 | Jones | 260—410.9 |
| 2,826,609 | 3/1958 | Kamlet | 260—537 |
| 2,844,612 | 7/1958 | Rottig | 260—410.9 |
| 2,851,493 | 9/1958 | Naughton | 260—537 |

FOREIGN PATENTS

| | | |
|---|---|---|
| 913,844 | 12/1962 | Great Britain. |
| 621,365 | 2/1963 | Belgium. |

OTHER REFERENCES

Allen et al.: (I), "Chemistry and Industry" (1961), p. 830.

Allen et al.: (II), "Chemistry and Industry" (1962), pp. 1621–2.

CHARLES B. PARKER, *Primary Examiner.*

DANIEL D. HORWITZ, *Examiner.*

ANTON H. SUTTO, *Assistant Examiner.*